United States Patent
Maeda (10) Patent No.: US 10,241,324 B2
(45) Date of Patent: Mar. 26, 2019

(54) MACHINE LEARNING DEVICE FOR LEARNING PROCEDURE FOR ALIGNING OPTICAL PART OF LIGHT SOURCE UNIT, AND LIGHT-SOURCE UNIT MANUFACTURING APPARATUS

(71) Applicant: FANUC CORPORATION, Yamanashi (JP)

(72) Inventor: Michinori Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/839,217

(22) Filed: Dec. 12, 2017

(65) Prior Publication Data

US 2018/0172983 A1  Jun. 21, 2018

(30) Foreign Application Priority Data

Dec. 19, 2016 (JP) .................................. 2016-245834

(51) Int. Cl.
| | |
|---|---|
| G02B 26/08 | (2006.01) |
| G06F 15/18 | (2006.01) |
| G02B 27/00 | (2006.01) |
| G02B 27/62 | (2006.01) |

(52) U.S. Cl.
CPC ..... *G02B 26/0875* (2013.01); *G02B 27/0012* (2013.01); *G02B 27/62* (2013.01); *G06F 15/18* (2013.01)

(58) Field of Classification Search
CPC . G02B 6/42; G02B 6/24; G02B 6/255; G02B 6/26; G02B 6/30; G02B 6/36; G02B 6/43; G02B 26/0875; G02B 27/0012; G02B 27/62; G02B 7/02; H01S 5/022; H01S 5/00
USPC ....................................... 359/226.2
See application file for complete search history.

(56) References Cited

U.S. PATENT DOCUMENTS

| | | | |
|---|---|---|---|
| 2004/0232237 A1 | 11/2004 | Kasai et al. | |
| 2012/0263202 A1 | 10/2012 | Steinle et al. | |
| 2013/0258505 A1* | 10/2013 | Yasui ................... | G02B 6/4226 359/819 |

FOREIGN PATENT DOCUMENTS

| | | |
|---|---|---|
| DE | 102014102080 A1 | 8/2015 |
| JP | 1-244989 A | 9/1989 |
| JP | 07-084171 A | 3/1995 |
| JP | 2002-122758 A | 4/2002 |
| JP | 2004-94900 A | 3/2004 |
| JP | 2005-235075 A | 9/2005 |
| JP | 2005-317841 A | 11/2005 |
| JP | 2006-222411 A | 8/2006 |

(Continued)

*Primary Examiner* — Euncha P Cherry
(74) *Attorney, Agent, or Firm* — Hauptman Ham, LLP (57) ABSTRACT

A machine learning device acquires decision data including an adjustment time of a position and an orientation of an optical part and a state of light measured by a light measurement device. The machine learning device includes a learning unit that learns a procedure for adjusting the position and the orientation of the optical part. The learning unit includes a reward calculation unit that calculates a reward based on the alignment adjustment time and the state of light, and a value function updating unit that updates a value function based on the reward. The learning unit includes a decision unit that sets a movement method of the optical part based on the value function.

5 Claims, 8 Drawing Sheets

(56) References Cited

FOREIGN PATENT DOCUMENTS

| | | |
|---|---|---|
| JP | 2008-170981 A | 7/2008 |
| JP | 2008-176342 A | 7/2008 |
| JP | 2009-222620 A | 10/2009 |
| JP | 6055058 B1 | 12/2016 |
| WO | 2010/057661 A1 | 5/2010 |

* cited by examiner

MACHINE LEARNING DEVICE FOR LEARNING PROCEDURE FOR ALIGNING OPTICAL PART OF LIGHT SOURCE UNIT, AND LIGHT-SOURCE UNIT MANUFACTURING APPARATUS

RELATED APPLICATIONS

The present application claims priority to Japanese Application Number 2016-245834, filed Dec. 19, 2016, the disclosure of which is hereby incorporated by reference herein in its entirety.

BACKGROUND OF THE INVENTION

1. Field of the Invention

The present invention relates to a machine learning device for learning a procedure for aligning an optical part of a light source unit, and a light-source unit manufacturing apparatus.

2. Description of the Related Art

A light source unit such as a laser diode module has been used for many devices. In a light source unit, optical parts such as a light-emitting element, a lens, and an optical fiber are fixed to a cabinet. In the manufacturing process of the light source unit, a light-emitting element is fixed at a predetermined position of the cabinet, and then other optical parts are fixed to the cabinet. The optical parts need to be fixed so as to be located in the optimum positions and the orientations relative to the light-emitting element. For example, the optical parts need to be disposed so as to output light with predetermined intensity in a predetermined direction. The optical parts are fixed to the cabinet such that the intensity of light received by the light-receiving element satisfies predetermined standards (For example, Japanese Unexamined Patent Publication No. 2008-176342A).

An operation for adjusting the position and the orientation of the optical part is referred to as alignment. The operation is also referred to as optical axis adjustment. In the process for aligning the optical part, light intensity and the like are measured while the position and the orientation of the optical part are changed. The position and the orientation are repeatedly changed until the measured light value satisfies a predetermined standard.

In an alignment process of the related art, an operator determines an alignment procedure beforehand based on his/her experience. The operator sets the position and the orientation of optical part and then analyzes the measured light value. After that, the operator repeatedly corrects the position and the orientation of the optical part based on the analysis results. In this way, a correction of the alignment procedure depends on the skill of the operator and is thus difficult to be performed automatically.

Japanese Unexamined Patent Publication No. 7-084171A discloses a control device for driving a lens that can control a lens holding frame so as to avoid a collision with a machine edge when a lens drive device for performing autofocus is driven for a search.

SUMMARY OF THE INVENTION

Generally, the position and the orientation of optical part can be expressed by positions (x, y, z) on the axes of a three-dimensional coordinate system and rotation angles ($\theta x$, $\theta y$, $\theta z$) around the axes. In other words, the position and the orientation of an optical part can be adjusted by using six axes. In a method where an operator determines an alignment procedure based on his/her experience, the operator selects an optimum procedure from many procedures.

At this point, an operation time for obtaining an optimum position and an optimum orientation varies greatly depending on the movement method of the optical part. In some cases, the alignment of the optical part may require an extended amount of time depending on the operator. This may reduce production efficiency. If an adjustment of the position and the orientation of the optical part is not completed within a predetermined time, the operation is typically terminated while an alarm is issued. When the alarm is issued, the operator decides that the part is defective. However, there are some cases in which the part may not be defective, whereby the yield of light source unit is reduced. Even if the alignment is completed, the alignment may include unnecessary operations. Alternatively, some alignments of the optical part may require a longer time than the minimum alignment time.

When the light source units of the same kind are manufactured, the operator can perform operations in the same alignment procedure regardless of variations in the quality of the parts. This method is effective for aligning the parts which have uniform quality. However, if the quality of the used parts varies, this alignment procedure is not optimum. The operator needs to review the alignment procedure. As a result, the variations in operation time are enlarged. Alternatively, the operator may repeat an unnecessary procedure or spend excessive time for relocating optical parts.

It is understood that the quality of the parts of light source unit affects the alignment of the optical part and many kinds of quality information are available. There are quite a large number of combinations of methods of movements on axes and part quality information. Thus, it is difficult for the operator to determine the alignment procedure while theoretically associating the part quality information with the alignment procedure.

A machine learning device according to an aspect of the present disclosure learns a procedure for aligning the optical part of a light source unit. The machine learning device includes a state observation unit that acquires state data including the position and the orientation of the optical part and quality information on a component of the light source unit. The machine learning device includes a decision data acquisition unit that acquires decision data including the adjustment time of the position and the orientation of the optical part and a state of light measured by a light measurement device. The machine learning device includes a learning unit that learns a procedure for adjusting the position and the orientation of the optical part based on the state data acquired by the state observation unit and the decision data acquired by the decision data acquisition unit. The learning unit includes a reward calculation unit that calculates a reward based on the adjustment time and the state of light that are acquired by the decision data acquisition unit. The learning unit includes a value function updating unit that updates a value function based on the reward set by the reward calculation unit. The learning unit includes a decision unit that sets the movement method of the optical part based on the value function.

A light-source unit manufacturing apparatus according to an aspect of the present disclosure includes a light measurement device that measures a state of light outputted from a light-emitting element, a movement device that moves an optical part while holding the same, and a controller that controls the movement device. The controller includes a state observation unit that acquires state data including the position and the orientation of the optical part and quality information on a component. The controller includes a decision data acquisition unit that acquires decision data including the adjustment time of the position and the orientation of the optical part and the state of light measured by the light measurement device. The controller includes a learning unit that learns a procedure for adjusting the position and the orientation of the optical part based on the state data acquired by the state observation unit and the decision data acquired by the decision data acquisition unit. The learning unit includes a reward calculation unit that calculates a reward based on the adjustment time and the state of light that are acquired by the decision data acquisition unit. The learning unit includes a value function updating unit that updates a value function based on the reward set by the reward calculation unit. The learning unit includes a decision unit that sets a movement method of the optical part based on the value function.

DETAILED DESCRIPTION

Referring to FIGS. 1 to 12, a machine learning device and a light-source unit manufacturing apparatus according to an embodiment will be described below. The machine learning device and the light-source unit manufacturing apparatus according to the embodiment learn the procedure for aligning the optical part of a light source unit.

Figure 1:
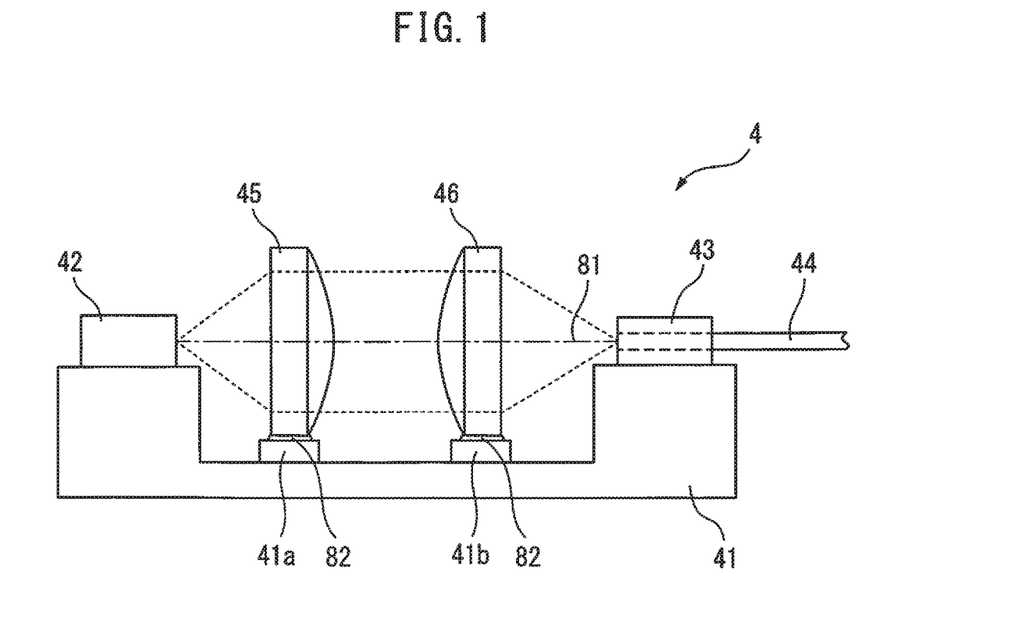
FIG. 1 is a schematic side view of a light source unit according to an embodiment.

FIG. 1 shows a schematic side view of the light source unit according to the present embodiment. A light source unit 4 according to the present embodiment causes light outputted from a light-emitting element 42 to enter an optical fiber 44. The light source unit 4 includes the light-emitting element 42 that outputs light such as a laser beam. The light-emitting element 42 is, for example, a laser diode. The light source unit 4 includes a first lens 45 and a second lens 46 that change the direction of travel of light. The first lens 45 and the second lens 46 are disposed with the curved surfaces thereof opposed to each other. The light source unit 4 includes a light-receiving element 43 that receives a laser beam that is outputted from the second lens 46. The optical fiber 44 is disposed in the light-receiving element 43.

The light-emitting element 42 and the light-receiving element 43 are fixed to a cabinet 41. The first lens 45 is fixed to a fixed portion 41a of the cabinet 41 with an adhesive 82. The second lens 46 is fixed to a fixed portion 41b of the cabinet 41 with the adhesive 82. The light that is outputted from the light-emitting element 42 is transformed into the parallel light by the first lens 45. The light that is outputted from the first lens 45 is collected through the second lens 46. After that, the light that is outputted from the second lens 46 enters the optical fiber 44 that is disposed in the light-receiving element 43. Thus, the light source unit 4 includes at least one optical part. In the present embodiment, the lenses 45 and 46 will be described as examples of optical parts for performing the alignment.

Figure 2:
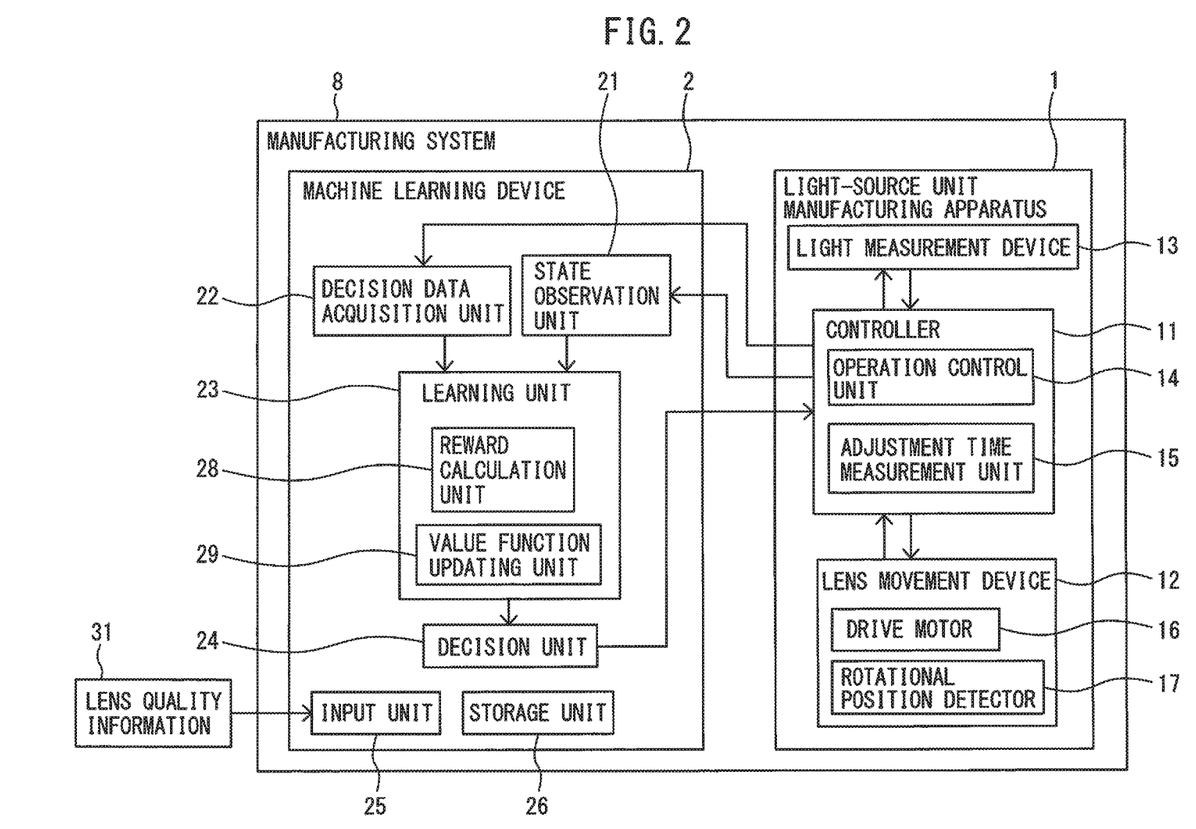
FIG. 2 is a block diagram of a first manufacturing system according to the embodiment.
Figure 3:
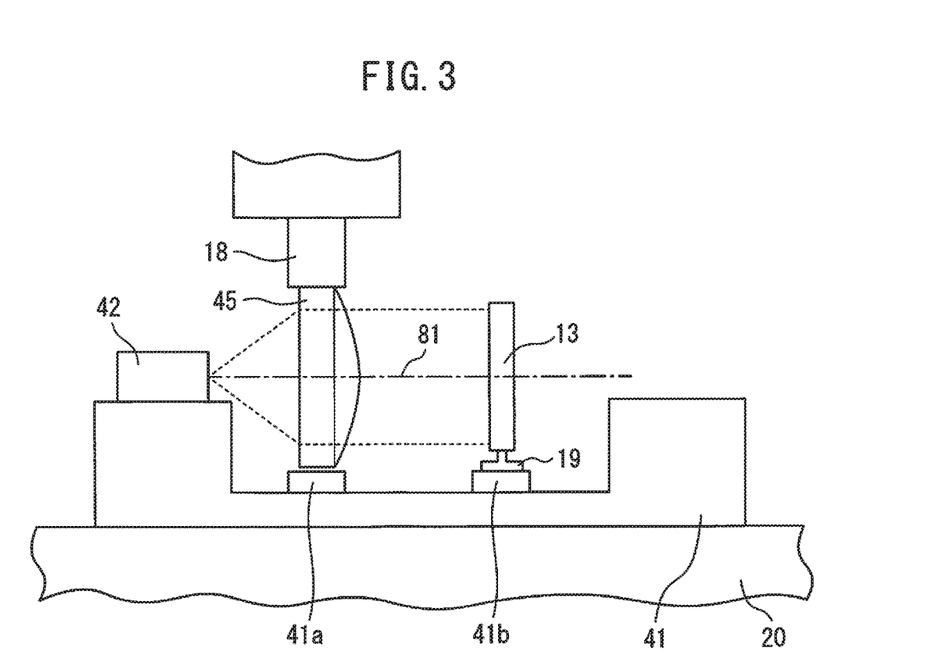
FIG. 3 is a side view showing the alignment of a first lens in a light-source unit manufacturing apparatus according to the embodiment.

FIG. 2 shows a block diagram of a first manufacturing system according to the present embodiment. FIG. 3 shows a side view of the light source unit during the alignment of the first lens. Referring to FIGS. 2 and 3, a manufacturing system 8 includes a light-source unit manufacturing apparatus 1 and a machine learning device 2. The light-source unit manufacturing apparatus 1 performs the alignment of the optical part that is disposed in the light source unit 4. In other words, the light-source unit manufacturing apparatus 1 adjusts the position and the orientation of the optical part. The machine learning device 2 is connected to the light-source unit manufacturing apparatus 1 so as to communicate with the light-source unit manufacturing apparatus 1. The machine learning device 2 learns a procedure for adjusting the position and orientation of the optical part based on information that is received from the light-source unit manufacturing apparatus 1 and lens quality information 31.

The light-source unit manufacturing apparatus 1 includes a lens movement device 12 acting as an optical-part movement device that moves the optical part. The lens movement device 12 of the present embodiment includes a stage 18 that holds the lenses 45 and 46. The lens movement device 12 includes a drive motor 16 for driving the stage 18 and a rotational position detector 17 that is attached to the drive motor 16.

The light-source unit manufacturing apparatus 1 includes a controller 11 that controls the lens movement device 12. The controller 11 is configured with an arithmetic processing device (computer) that includes a central processing unit (CPU), a random access memory (RAM), and a read only memory (ROM) that are connected to one another via a bus. The controller 11 includes an operation control unit 14 that transmits an operation command to a light measurement device 13 and the lens movement device 12. The drive motor 16 of the lens movement device 12 is driven in response to the operation command.

The drive motor 16 is driven so as to change the position and the orientation of the stage 18. Moreover, the rotational position detector 17 detects the rotational position of the output shaft of the drive motor 16. The positions and the orientations of the lenses 45 and 46 are detected based on the output of the rotational position detector 17.

Figure 4:
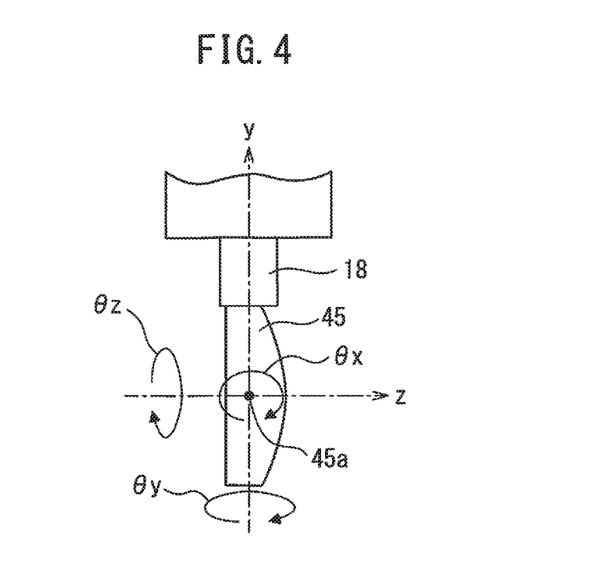
FIG. 4 is a side view of a lens and a stage during the alignment of the lens.

FIG. 4 shows a side view of the stage and the lens when the position and the orientation of the lens are adjusted. For example, the stage 18 can hold the lens 45 by suction. The drive motor 16 is driven so as to change the position and the orientation of the stage 18 and change the position and the orientation of the lens 45. In the present embodiment, the position of the lens 45 is expressed by positions (x, y, z) on the axes of a three-dimensional coordinate system. The orientation of the lens 45 is expressed by rotational positions (θx, θy, θz) along driving axes for rotational movements.

In the present embodiment, a center point 45a is set beforehand on the lens 45. As a coordinate system indicating the position of the lens 45, for example, a coordinate system including x axis, y axis, and z axis can be set with an origin at any position of the cabinet 41. As a coordinate system indicating the orientation (rotational position) of the lens 45, for example, x axis, y axis, and z axis are set with an origin at the center point 45a of the lens. Moreover, the coordinate system can be used with a driving axis around the x axis, a driving axis around the y axis, and a driving axis around the z axis. Rotation angles along the respective driving axes can be defined as the rotational position of the lens 45. For example, the coordinate value of the driving axis around the x axis can be expressed by the rotation angle θx.

The lens movement device 12 of the present embodiment adjusts the position and the orientation of the lens 45 along the six driving axes. The lens movement device is not limited to this configuration as long as the position and the orientation of the lens are adjustable. For example, the position and the orientation of the lens may be adjusted by, for example, five driving axes depending on the shape of the optical part. In this case, the lens movement device may have any configuration as long as the stage is formed to move based on the five driving axes. Furthermore, the lens movement device may include an image processing device and a detector in order to compensate for a relative displacement of the position and the orientation of the lens when the lens is mounted.

Referring to FIGS. 2 and 3, the light-source unit manufacturing apparatus 1 includes the light measurement device 13. The light measurement device 13 is formed so as to detect the property of light. The light measurement device 13 of the present embodiment is formed so as to detect the distribution of the light intensity. The light measurement device 13 can detect the intensity of light, a mode pattern of light, and the center position of light. The mode pattern is determined by the distribution of the light intensity. For example, when the mode pattern is a single mode, a laser beam is a Gaussian beam.

The light measurement device 13 may be, for example, a fixed-type optical sensor. The optical sensor includes a charge couple device (CCD) and the CCD can detect the distribution of the light intensity. In the present embodiment, a two-dimensional optical sensor is used. The light measurement device 13 may be a measuring device that can detect at least one state of light. For example, a scanning-type optical sensor may be used.

In the example of FIG. 3, the light measurement device 13 is supported by a support member 19. The support member 19 is placed on the fixed portion 41b. The light measurement device 13 may be fixed at a position where the light-receiving element 43 is disposed. Moreover, the light-source unit manufacturing apparatus may include a reflection mirror that guides light to the outside of the light source unit. In this case, the light measurement device may be disposed outside the light source unit. In the present embodiment, the light measurement device 13 is disposed so as to cross an optical axis 81 of light that is outputted from the light-emitting element 42. Furthermore, the light measurement device 13 is disposed such that a light-sensitive surface is perpendicular to the optical axis 81. The light measurement device 13 is controlled by the controller 11. Information on the state of light that is measured by the light measurement device 13 is transmitted to the controller 11.

In the light-source unit manufacturing apparatus 1 of the present embodiment, the two lenses 45 and 46 are aligned by the stage 18 that is movable along the six axes. In the present embodiment, the second lens 46 is aligned after the alignment of the first lens 45.

In the respective alignments of the lenses 45 and 46, the positions and the orientations of the lenses 45 and 46 are adjusted such that the intensity of light received by the light-receiving element 43 exceeds a predetermined decision value. Furthermore, the positions and the orientations of the lenses 45 and 46 are adjusted such that the distribution of the light intensity is close to an ideal mode pattern. Moreover, the positions and the orientations of the lenses 45 and 46 are adjusted such that the center position of light is close to the central axis of the optical fiber.

In the alignment of the present embodiment, the lenses 45 and 46 are moved by a short distance or a small angle along one of the predetermined six axes. Subsequently, it is decided whether the state of light received by the light measurement device 13 has improved or not. This operation is repeated until the state of light that is received by the light measurement device 13 falls within a predetermined decision range. The decision range of the state of light is determined in advance by the operator and is stored in a storage unit 26.

Figure 5:
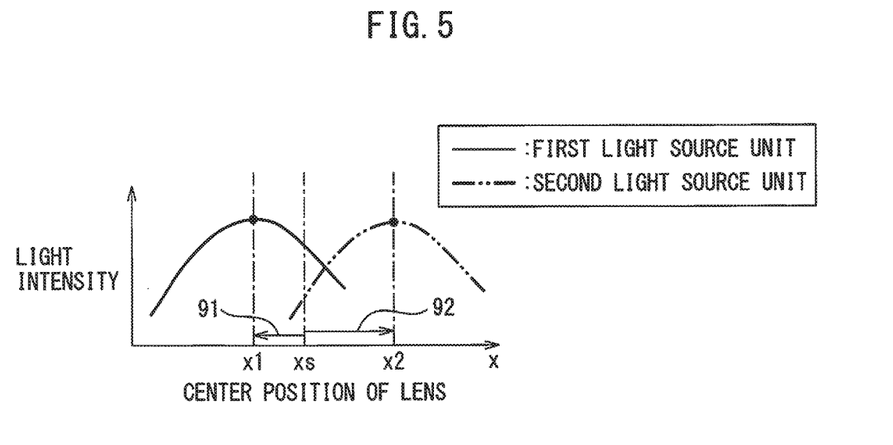
FIG. 5 is a graph of light intensity relative to a lens position in the x-axis direction.

FIG. 5 shows a graph of the relationship between a lens center position in the direction of x axis and the light intensity that is detected by the light measurement device. In the graph of FIG. 5, the lenses of the same kind are aligned in two light source units of the same kind. The graph shows the relationship between laser beam intensity and a lens center position. A position xs is the center position of the lens at the start of the alignment of the lens. In the first light source unit, the intensity of light is maximized when the center position of the lens is located at a position x1, whereas in the second light source unit, the intensity of light is maximized when the center position of the lens is located at a position x2.

The lens that is mounted in the first light source unit and the lens that is mounted in the second light source unit are manufactured with the same design specifications by the same manufacturing method. However, the optimum positions and the orientations of the lenses vary depending on, for example, the quality of the lenses. In the first light source unit, the lens needs to be moved from the alignment start position xs toward the negative side of the x axis as indicated by an arrow 91. In the second light source unit, the lens needs to be moved from the alignment start position xs toward the positive side of the x axis as indicated by an arrow 92.

As described above, even if the lenses are designed with the same specifications, the optimum positions of the lenses vary depending on the quality of the lenses. When the operator aligns the second light source unit after the alignment of the first light source unit, the operator refers to the optimum lens position x1 of the first light source unit. The operator can set the alignment start position near the position x1. Alternatively, the operator can move the lens from the position xs toward the negative side of the x axis. However, the optimum position x2 of the second light source unit is separated from the position x1. The optimum position x2 of the second light source unit is located on the opposite side of the position x1 with respect to the initial position xs. Thus, the alignment of the second light source unit requires a long adjustment time.

In the present embodiment, the lenses 45 and 46 can be moved based on the six driving axes. The lenses 45 and 46 can be moved toward the positive side or the negative side along the driving axes. In other words, each of the lenses 45 and 46 can be moved in one of the twelve movement directions. The lenses 45 and 46 can be moved in many directions. Although a short adjustment time is preferable for alignment, it is difficult for the operator to select optimum one of the movement directions so as to shorten the adjustment time.

Furthermore, the lens quality includes a lens shape, the composition of lens materials, the index of refraction of the lens, a focal length, and the property of an optical thin film that is deposited on a surface. It is difficult for the operator to select an optimum movement direction in consideration of lens quality in addition to many movement directions. The machine learning device of the present embodiment learns a procedure for aligning the lens with a short adjustment time in consideration of the movement directions of the lens and lens quality. Machine learning according to the present embodiment will be described below.

The machine learning device has the function of extracting useful rules, criteria, and the like by analysis from data sets that are inputted to the device, outputting the decision result, and learning knowledge (machine learning). Various machine learning methods are available and are classified into, for example, "supervised learning", "unsupervised learning", and "reinforcement learning". In the present embodiment, the reinforcement learning (Q learning) of the machine learning is conducted. Furthermore, in order to implement the reinforcement learning, a method called "deep learning" is used in which the extraction of a feature amount is learned.

First, problem that is set for reinforcement learning is considered as follows:

The manufacturing system (including, for example, the controller of the light-source unit manufacturing apparatus and the machine learning device) observes a state of an environment and determines an action.

The environment may be changed according to some rules and the action of the system itself may change the environment.

A reward signal is returned for each action.

The variable to be maximized is the total reward (discount) that is obtained in the future.

Learning is started from a state in which the result of the action is completely unknown or is not sufficiently known. Specifically, the machine learning device cannot obtain the result of the action as data until the action is actually performed. In other words, the machine learning device needs to search for an optimum action by trial and error.

The leaning can also be started from a proper starting point in an initial state where preparation learning (supervised learning or inverse reinforcement learning) is conducted so as to mimic the actions of a human.

Here, in reinforcement learning (Q learning), the action is learned in addition to decision and classification, whereby a proper action is learned based on the interaction of the action with an environment. In other words, in a method of reinforcement learning, a method for maximizing a reward that is obtained in the future is learned.

The reinforcement learning is a method for learning an action value Q(s, a) for selecting an action "a" in a certain environment state "s". Specifically, in a certain state "s", an action a with a maximum action value Q(s, a) is preferably selected as the optimum action. However, in an initial state, the correct value of the action value Q(s, a) is completely unknown regarding a combination of the state "s" and the action "a". Thus, an agent (the subject of an action) selects various actions "a" in a certain state "s" and the reward is provided with respect to the action "a" at that time. This allows the agent to learn selection of a better action, that is, a correct action value Q(s, a).

Furthermore, in order to maximize a total reward that is obtained in the future as a result of the action, Q(s, a)=E[Σ (γ$^t$)r$_t$] is set as a target. In this case, an expected value is obtained when the state changes in response to an optimum action. The expected value is still an unknown value and is thus learned during a search. The update expression of the action value Q(s, a) can be given by, for example, the following Equation (1).

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In the Equation (1), $s_t$ represents the state of the environment at time t, and $a_t$ represents the action at time t. The state is changed to $s_t$a by the action $a_t$. The reward that is acquired by the change of the state is represented by $r_{t+1}$. The term with "max" is a Q value that is multiplied by γ when the action a that has the highest known Q value is selected under the state $s_{t+1}$. Here, γ is a parameter of 0<γ≤1, called discount factor. Symbol α is a learning coefficient in the range of 0<α≤1.

The above-described Equation (1) represents a method for updating the action value $Q(s_t, a_t)$ of the action $a_t$ in the state $s_t$ on the basis of the reward $r_{t+1}$ that is returned as a result of the action $a_t$. That is, this indicates that if the sum of the reward $r_{t+1}$ and an action value $Q(s_{t+1}, \max a_{t+1})$ of the best action max a in a subsequent state caused by the action a is greater than the action value $Q(s_t, a_t)$ of the action a in the state s, $Q(s_t, a_t)$ is increased. In contrast, if the sum is less than the action value $Q(s_t, a_t)$, $Q(s_t, a_t)$ is decreased. In other words, value of a given action in a given state is brought closer to a reward immediately returned as a result and value of the best action in a subsequent state caused by the given action.

Here, Q(s, a) is represented on a computer by a method in which the values of all state and action pairs (s, a) are stored in a table or by a method in which a function of approximating Q(s, a) is prepared. By the latter method, the above-described Equation (1) can be achieved by adjusting a parameter of an approximate function by a technique such as stochastic gradient descent. A neural network, which will be described later, can be used for the approximate function.

Figure 6:
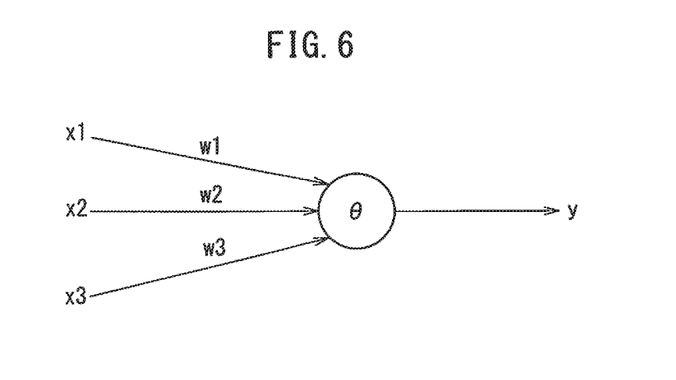
FIG. 6 is a schematic diagram of a neuron model.
Figure 7:
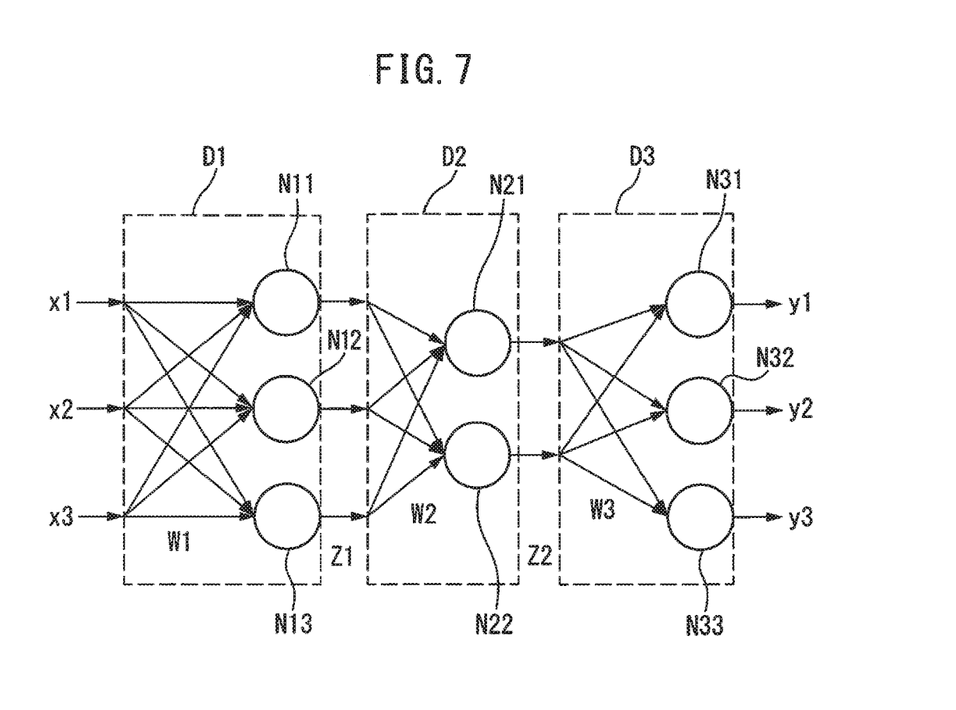
FIG. 7 is a schematic diagram of a three-layer neural network which is configured by combining a plurality of neurons.

The neural network can be used for an approximate algorithm of the value function in reinforcement learning. FIG. 6 is a diagram schematically illustrating a neuron model. FIG. 7 is a diagram schematically illustrating a three-layer neural network constituted by a combination of neurons illustrated in FIG. 6. That is, the neural network is constituted by, for example, an arithmetic device, a memory, and the like that simulate a neuron model as illustrated in FIG. 6.

As illustrated in FIG. 6, the neuron outputs an output (result) y for a plurality inputs x (inputs x1 to x3 in FIG. 6 as an example). Each of the inputs x (x1, x2, x3) is multiplied by respective weights w (w1, w2, w3) that corresponds to the inputs x. By adopting this process, the neuron outputs the result y represented by Equation (2) below. Note that each of the inputs x, the result y, and the weights w is a vector. In the following Equation (2), θ is a bias, and $f_k$ is an activation function.

$$y = f_k(\Sigma_{i=1}^n x_i w_i - \theta) \quad (2)$$

With reference to FIG. 7, the three-layer neural network constituted by a combination of the neurons illustrated in FIG. 6 will now be described. As illustrated in FIG. 7, a plurality of inputs x (here, an input x1 to input x3 as an example) are input from the left side of the neural network. Results y (here, a result y1 to result y3 as an example) are output from the right side. Specifically, the inputs x1, x2, x3 are multiplied by the respective weights and are then input to respective three neurons N11 to N13. The weights that are used for the multiplication of these inputs are represented by W1 in the aggregate.

The neurons N11 to N13 output z11 to z13, respectively. In FIG. 7, z11 to z13 are represented by a feature vector Z1 in the aggregate, that can be regarded as a vector resulting from extraction of the quantity of features of the input vectors. This feature vector Z1 is a feature vector between the weight W1 and the weight W2. z11 to z13 are multiplied by the respective weights and are then input to two neurons N21 and N22. The weights for the multiplication of these feature vectors are represented by W2 in the aggregate.

The neurons N21, N22 output z21, z22, respectively. In FIG. 7, z21, z22 are represented by a feature vector Z2 in the aggregate. This feature vector Z2 is a feature vector between the weight W2 and a weight W3. z21, z22 are multiplied by the respective weights and are then input to each of three neurons N31 to N33. The weights for the multiplication of these feature vectors are represented by W3 in the aggregate.

Lastly, the neurons N31 to N33 output the result y1 to the result y3, respectively. The neural network operates in a learning mode and a value prediction mode. For example, the weight W is learned with a learning data set in the learning mode, and an action of the control device is determined with the parameter in the prediction mode. The term "prediction" is used for convenience; however, it should be noted that various tasks, such as detection, classification, and inference, can be achieved.

Here, data acquired by actually operating the controller of the light-source unit manufacturing apparatus in the prediction mode can be immediately learned and reflected in a subsequent action (online learning). Alternatively, learning is performed with all data groups that are collected in advance, and from then on, a detection mode may be performed with the parameter (batch learning). Alternatively, the learning mode can be interposed every time when a certain amount of data is accumulated, which is an intermediate technique between the above two techniques.

The weights W1 to W3 can be learned by the backpropagation method. Information on an error enters from the right side and is transferred to the left side. The Backpropagation method is a technique that adjusts (learns) the weight for each of neurons so as to reduce a difference between output y when input x is input and true output y (teacher). The number of layers of such a neural network may be increased to be three or more, and the learning method is referred to as deep learning.

The machine learning device 2 of the present embodiment performs the reinforcement learning. Referring to FIG. 2, the machine learning device 2 is configured with an arithmetic processing device (computer) that includes a CPU, a RAM, and the like. In the present embodiment, the action corresponds to a behavior for moving the lens by a small distance or a small angle in one of the drive axes. Moreover, regarding the action for moving the lens from each position, the action value is calculated based on the value function. A direction of movement is selected based on the action value.

The machine learning device 2 includes a state observation unit 21 that acquires state data including the position and the orientation of the optical part and quality information on the component of the light source unit 4. The optical part of the present embodiment is a lens. The state observation unit 21 acquires the position and the orientation of the lens from the controller 11 of the light-source unit manufacturing apparatus 1.

The operator inputs lens quality information 31 beforehand to the input unit 25 of the machine learning device 2. The machine learning device 2 includes the storage unit 26 in which any learning information that relates to the learning is stored. The lens quality information 31 that is inputted to the input unit 25 is stored in the storage unit 26. The lens quality information 31 includes, for example, a material composition, a lens shape, an index of refraction, a focal length, a characteristic of an optical thin film deposited on a surface, and manufacturing information on a material lot, a manufacturing apparatus, the operator, a manufacturing process, and date of manufacture. At least one of these items can be used as the lens quality information 31. The state observation unit 21 acquires the lens quality information 31 as quality information on the components from the storage unit 26.

As quality information on components, the information is preferably inputted for each component. However, regarding quality information on components, component information for each manufacturing lot may be used as a representative value. The quality information on components may be deleted when being regarded as being unnecessary after an alignment procedure is optimized by learning.

The machine learning device 2 includes a decision data acquisition unit 22 that acquires decision data. The decision data is used for setting a reward in a value function in reinforcement learning. The decision data includes a state of light that is measured by the light measurement device 13. In the present embodiment, the decision data acquisition unit 22 acquires light intensity, a light mode pattern, and a center position of light as states of light.

Moreover, the decision data acquisition unit 22 acquires an adjustment time for adjusting the position and the orientation of the optical part. In other words, the decision data acquisition unit 22 acquires a time that is required from the start of the alignment to the end of the alignment. The controller 11 of the light-source unit manufacturing apparatus 1 includes an adjustment time measurement unit 15. The adjustment time measurement unit 15 detects an operation time when the lens is moved by a small distance or a small angle so as to measure light. By the summation of the operation times of movements, the adjustment time that is required from the start of alignment to the end of alignment can be calculated. The decision data acquisition unit 22 acquires the adjustment time from the controller 11.

The machine learning device 2 includes a learning unit 23 that learns a procedure for adjusting the position and the orientation of the optical part. The learning unit 23 conducts learning based on the state data that is acquired by the state observation unit 21 and the decision data that is acquired by the decision data acquisition unit 22. The learning unit 23 includes a reward calculation unit 28 that calculates a reward based on the adjustment time and the state of light that are acquired by the decision data acquisition unit 22. The learning unit 23 includes a value function updating unit 29 that updates the value function based on the reward set by the reward calculation unit 28.

The machine learning device 2 includes a decision unit 24 that sets the movement method of the lens based on the value function that is set by the learning unit 23. In the present embodiment, the decision unit 24 sets the direction of the movement of the lens as the movement method of the lens. Specifically, the decision unit 24 selects the direction of movement from a current lens position, from the positive and negative directions on the six driving axes. The movement method that is set for the lens by the decision unit 24 may include a distance and an angle of movement.

A command of the movement direction that is set by the decision unit 24 is transmitted to the controller 11 of the light-source unit manufacturing apparatus 1. The operation control unit 14 drives the lens movement device 12 based on the received command of the movement direction. The lens movement device 12 changes the position and the orientation of the lens.

Figure 8:
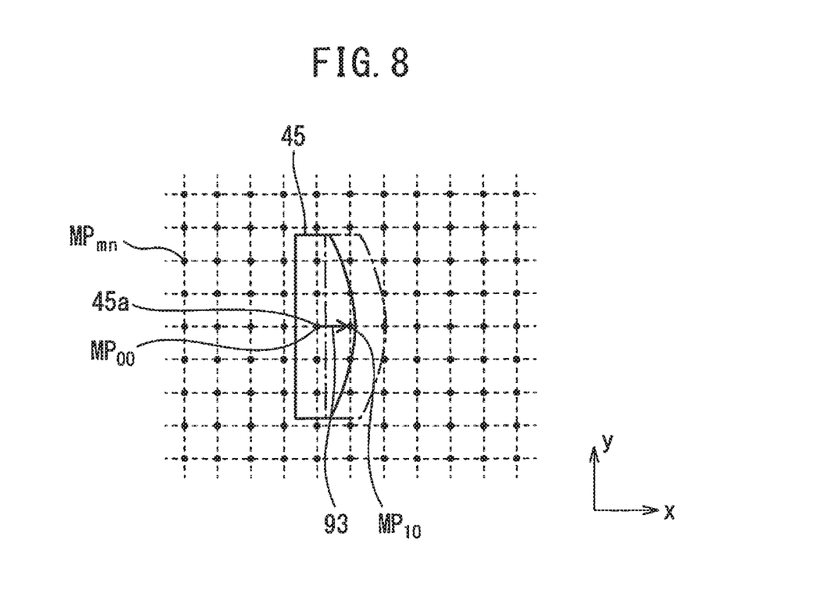
FIG. 8 is a schematic diagram for explaining a movement of the lens.

FIG. 8 shows a schematic diagram for explaining a movement of the lens according to the present embodiment. In FIG. 8, for simplicity of explanation, the x axis and the y axis of the six driving axes are illustrated. In the example of FIG. 8, the lens 45 moves on a two-dimensional plane. In this example, the lens 45 moves along the x axis or the y axis.

In an area where the lens 45 is likely to move, movement points $MP_{mn}$ are set in a lattice pattern. A small distance between the movement points is fixed. In this example, the lens 45 is disposed at a movement point $MP_{00}$. The center point 45a of the lens 45 is disposed at the movement point $MP_{00}$. The lens 45 can move in four directions that include the positive side and the negative side of the x axis and the positive side and the negative side of the y axis. Action values are calculated for movements in the four directions. The decision unit 24 can select the movement direction at the movement point based on the action values for the respective movement directions. In the example of FIG. 8, the lens 45 is moved to the positive side of the x axis as indicated by arrow 93. The center point 45a of the lens 45 moves to a movement point $MP_{10}$. In this way, the lens movement device can move the lens based on the driving axes.

Figure 9:
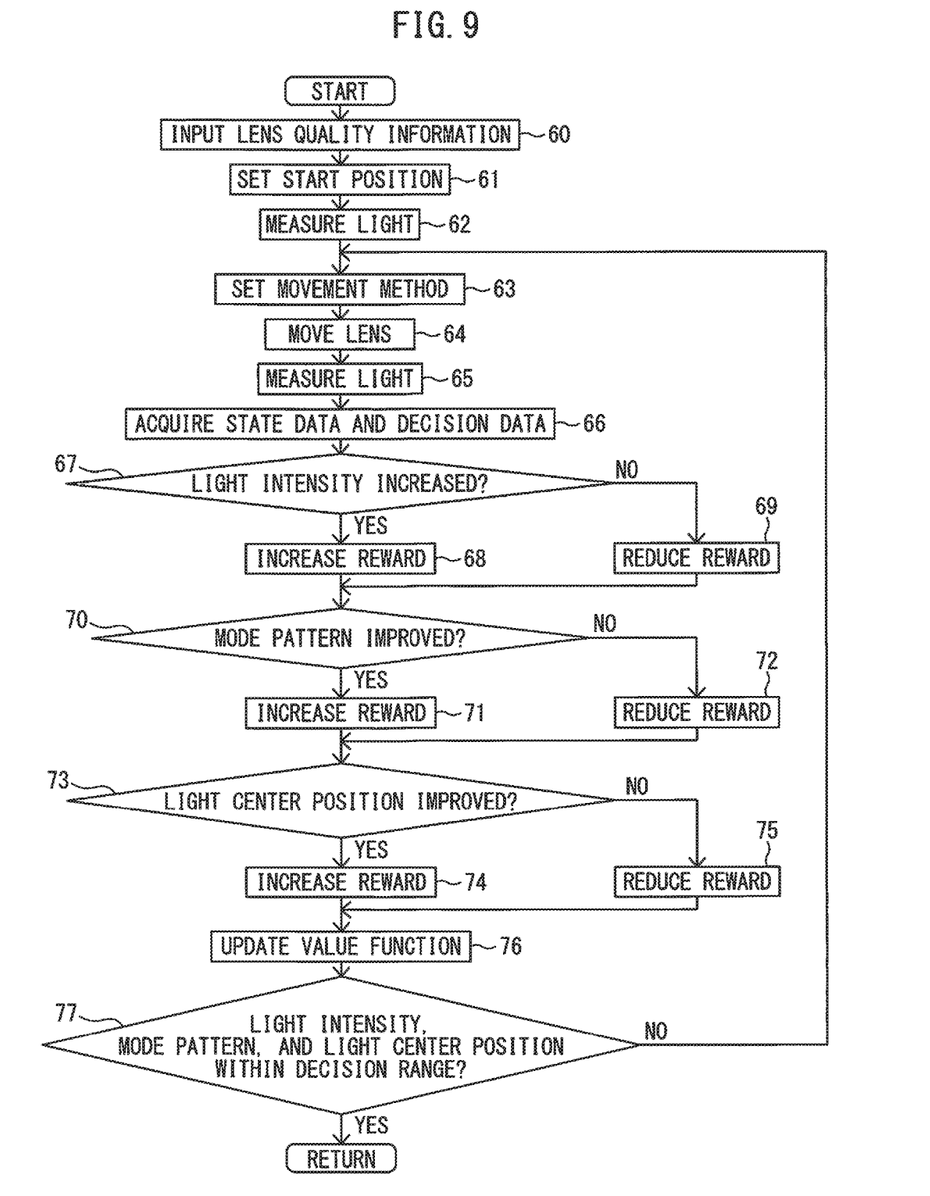
FIG. 9 is a flowchart of learning control by the machine learning device according to the embodiment.

FIG. 9 shows a flowchart of control on machine learning according to the present embodiment. Referring to FIGS. 2 and 9, in step 60, the operator inputs the lens quality information 31 to the input unit 25 of the machine learning device 2. The storage unit 26 stores the lens quality information 31.

In step 61, the decision unit 24 sets the position and the orientation of the lens at the beginning of the alignment of the lens. In the example of FIG. 9, alignment is started at a predetermined position. The decision unit 24 sets this position as an alignment start position.

In step 62, the light measurement device 13 measures light. In the present embodiment, the light measurement device 13 measures the light intensity, the mode pattern, and the center position of light. The controller 11 receives a measurement result at the initial position. The decision data acquisition unit 22 acquires the measurement result at the initial position from the controller 11.

In step 63, the decision unit 24 sets a direction of movement from the current position. The decision unit 24 can select the direction that corresponds to the large action value. A predetermined initial value is set for the action value of the movement direction from each of the movement points. Alternatively, the movement direction may be set based on ε-greedy algorithm. In other words, the direction may be randomly selected with probability ε. The movement direction that is set by the decision unit 24 is transmitted to the controller 11.

In step 64, the controller 11 drives the lens movement device 12 based on the movement direction that is set by the decision unit 24. The lens 45 is moved by the small distance or the small angle so as to change the position and the orientation of the lens 45. The rotational position detector 17 detects the rotational position of the output shaft of the drive motor 16. The operation control unit 14 acquires the positions of the axes after the movement.

In step 65, the light measurement device 13 measures light. The light measurement device 13 measures the light intensity, a mode pattern, and the center position of light. The controller 11 receives the measurement result.

In step 66, the state observation unit 21 of the machine learning device 2 acquires state data. The state observation unit 21 acquires the position of the lens on each of the axes. The state observation unit 21 acquires the lens quality information 31 that is stored in the storage unit 26, from the storage unit 26. The decision data acquisition unit 22 acquires decision data. The decision data acquisition unit 22 receives the measurement results of the light intensity, the mode pattern, and the center position of the light from the controller 11. The state data and the decision data are stored in the storage unit 26.

In step 67, the reward calculation unit 28 of the learning unit 23 decides whether or not the light intensity of the current position and orientation of the lens has increased from the light intensity of the previous position and orientation of the lens. In step 67, if the light intensity has increased, the control advances to step 68. In step 68, the reward calculation unit 28 performs a control in which the reward included in the value function is increased with respect to the current movement.

In step 67, if the light intensity has not increased, the control advances to step 69. In step 69, the reward calculation unit 28 performs a control in which the reward included in the value function is reduced with respect to the current movement.

Subsequently, in step 70, the reward calculation unit 28 decides whether or not the light mode pattern of the current position and orientation of the lens is superior to the light mode pattern of the previous position and orientation of the lens. In other words, the reward calculation unit 28 decides whether or not the mode pattern has improved or not. For example, in the case of light in the single mode, the reward calculation unit 28 can decide whether or not the shape of the light intensity distribution is close to symmetrical shape with respect to a maximum intensity point. The reward calculation unit 28 can decide that the mode pattern has improved as the intensity distribution becomes closer to the symmetrical shape. Moreover, the reward calculation unit 28 can decide whether the circularity of the intensity distribution is close to 1 or not. The reward calculation unit 28 can decide that the mode pattern has improved as the circularity becomes closer to 1.

In step 70, if the light mode pattern of the current position and orientation of the lens is superior to the light mode pattern of the previous position and orientation of the lens, the control advances to step 71. In step 71, the reward calculation unit 28 performs a control in which the reward included in the value function is increased with respect to the current movement. In step 70, if the mode pattern has not improved, the control advances to step 72. In step 72, the reward calculation unit 28 performs a control in which the reward included in the value function is reduced with respect to the current action.

Subsequently, in step 73, the reward calculation unit 28 decides whether the center position of light has improved or not. Light preferably enters the position of the central axis of the optical fiber 44 in the light-receiving element 43. The optimum point of the center position of light is set in advance. The reward calculation unit 28 decides whether or not the light intensity of the current position and orientation of the lens has a maximum point closer to the optimum point than the maximum point of the light intensity of the previous position and orientation of the lens. If the maximum point of the current light intensity is closer to the optimum point than the maximum point of the previous light intensity, the reward calculation unit 28 can decide that the center position of light has improved.

In step 73, if the center position of light has improved, the control advances to step 74. In step 74, the reward calculation unit 28 performs a control in which the reward included in the value function is increased with respect to the current movement. In step 73, if the center position of light has not improved, the control advances to step 75. In step 75, the reward calculation unit 28 performs a control in which the reward included in the value function is reduced with respect to the current movement.

When the reward is increased in steps 68, 71, and 74, any method can be used. For example, if the criterion is the light intensity, the reward calculation unit 28 can perform a control in which the reward is increased the larger the increase amount of the light intensity. Alternatively, the reward calculation unit 28 may perform a control in which the reward is increased by a predetermined increase amount.

When the reward is reduced in steps 69, 72, and 75, any method can be used. For example, the criterion is the light intensity, the reward calculation unit 28 can perform a control in which the reward is reduced the larger the reduction amount of the light intensity. Alternatively, the reward calculation unit 28 may perform a control in which the reward is reduced by a predetermined reduction amount.

In this way, if a state of light has been improved by moving the lens, the reward calculation unit 28 performs the control in which the reward is increased. Furthermore, if a state of light has been deteriorated by moving the lens, the reward calculation unit 28 performs the control in which the reward is reduced. In steps 67, 70, and 73, if the previous state of light is identical to the current state of light, the reward calculation unit performs a control in which the reward is reduced. However, the control is not limited to this embodiment. If the state of light is not changed, the reward calculation unit performs a control in which the reward may be kept at a current value.

Subsequently, in step 76, the value function updating unit 29 updates the value function based on the reward that is set by the reward calculation unit 28.

After that, in step 77, the decision unit 24 of the machine learning device 2 decides whether or not the light intensity, the mode pattern, and the center position of light fall within the predetermined decision range. In other words, the decision unit 24 decides whether or not the state of light satisfies desired conditions. In step 77, if the light intensity, the mode pattern, and the center position of light fall within the decision range, this control is terminated. In step 77, if at least one of the light intensity, the mode pattern, and the center position of light is set outside the decision range, the control returns to step 63. In step 63, the decision unit 24 sets a direction of movement from the current position and orientation. Moreover, the machine learning device 2 can repeat the controls of step 63 to step 77 until the state of light falls within the decision range.

The adjustment time measurement unit 15 of the controller 11 can detect a time from the start of alignment to the end of alignment. After the completion of control in FIG. 9, the decision data acquisition unit 22 acquires the adjustment time from the controller 11. Furthermore, the reward calculation unit 28 can update the reward of the value function of each movement based on the adjustment time. For example, the reward calculation unit 28 can perform a control in which the reward is reduced the longer the adjustment time. Alternatively, the reward calculation unit 28 can perform a control in which the reward is increased the shorter the adjustment time.

After that, the value function updating unit 29 updates value functions for all movement routes on which the current alignments of lens has been performed. Moreover, the value function updating unit 29 can calculate the action value for each movement based on the corrected value function. The subsequent lens of the light source unit can be aligned based on the updated action value.

As described above, the machine learning device 2 can learn the procedure for adjusting the position and the orientation of the lens. Moreover, the lens is moved based on the learning result so as to be aligned in a short time. After the completion of an adjustment to the position and the orientation of the first lens 45, the first lens 45 is fixed to the fixed portion 41a with the adhesive 82.

In the above embodiment, the alignment of the lens is started at a predetermined position. The present invention is not limited to this embodiment. The alignment start position of the lens can be also learned by machine learning. For example, the alignment start position of the lens can be also learned by reinforcement learning. The state observation unit 21 can acquire the lens quality information and the start position. The decision data acquisition unit 22 can acquire an adjustment time that is required for alignment from the adjustment time measurement unit 15. The reward calculation unit 28 can set a reward based on the adjustment time. For example, the shorter the adjustment time, the more the reward calculation unit 28 can increase the reward. The value function updating unit 29 can update the value function based on the set reward. The decision unit 24 can set the alignment start position of the lens according to the action value that is calculated based on the value function.

Alternatively, the alignment start position of the lens may be learned by the supervised learning. In the supervised learning, the machine learning device is provided with teacher data, that is, a large number of data sets of inputs and results (labels). The machine learning device can learn the features of the data sets and inductively obtain a model (error model) for estimating a result from an input, that is, the relationship. Quality information on parts and the alignment start position of the lens can be inputted as input data. The machine learning device can output an alignment time as output data. The machine learning device can select a start position so as to reduce the alignment time.

Figure 10:
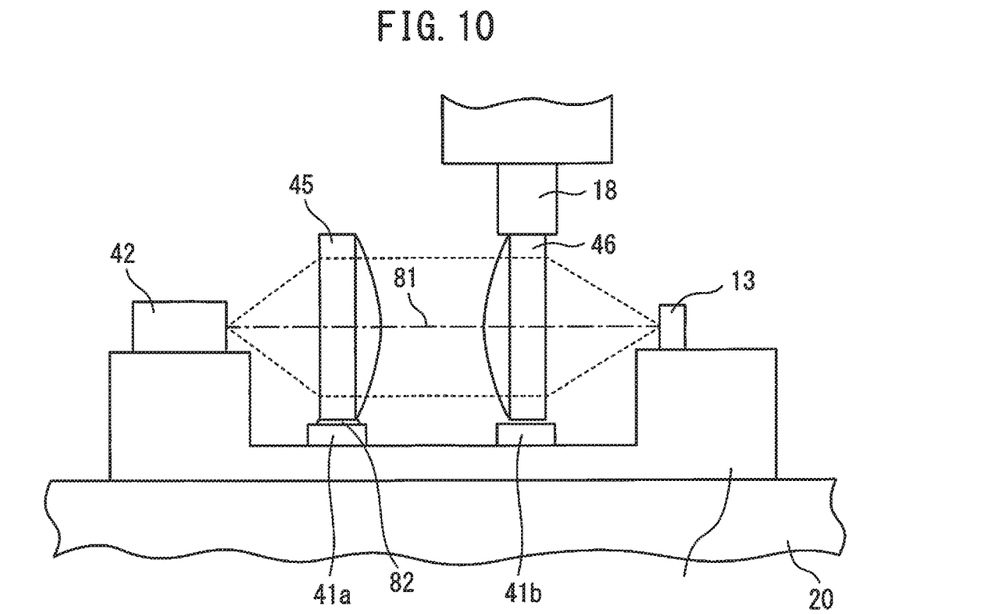
FIG. 10 is a side view of the light source unit when a second lens is aligned.

FIG. 10 shows a side view when the position and the orientation of the second lens are adjusted according to the present embodiment. In the present embodiment, after the completion of the adjustment to the position and the orientation of the first lens 45, the position and the orientation of the second lens are adjusted. The stage 18 of the light-source unit manufacturing apparatus 1 holds the second lens 46. The light measurement device 13 is disposed at a position corresponding to the position of the light-receiving element 43 in the cabinet 41. For example, the light measurement device 13 is disposed such that the optical axis 81 of the light-emitting element 42 is perpendicular to the light-receiving surface. Moreover, the light measurement device 13 is disposed such that the optical axis 81 substantially passes through the center of the light-receiving surface.

Subsequently, the position and the orientation of the second lens 46 can be adjusted by the same alignment method as the first lens 45. After the completion of an adjustment to the position and the orientation of the second lens 46, the second lens 46 is secured to the fixed portion 41b with the adhesive 82.

In this way, the first lens 45 and the second lens 46 can be aligned. In the present embodiment, the second lens is aligned after the alignment of the first lens 45. However, the embodiment is not limited to this. The first lens 45 and the second lens may be simultaneously aligned. In this case, the light-source unit manufacturing apparatus can hold the first lens by the first stage and the second lens by the second stage. The light-source unit manufacturing apparatus can repeatedly control the movement of one of the first lens and the second lens so as to acquire the state of light. In this way, the light-source unit manufacturing apparatus may simultaneously align multiple optical parts.

Figure 11:
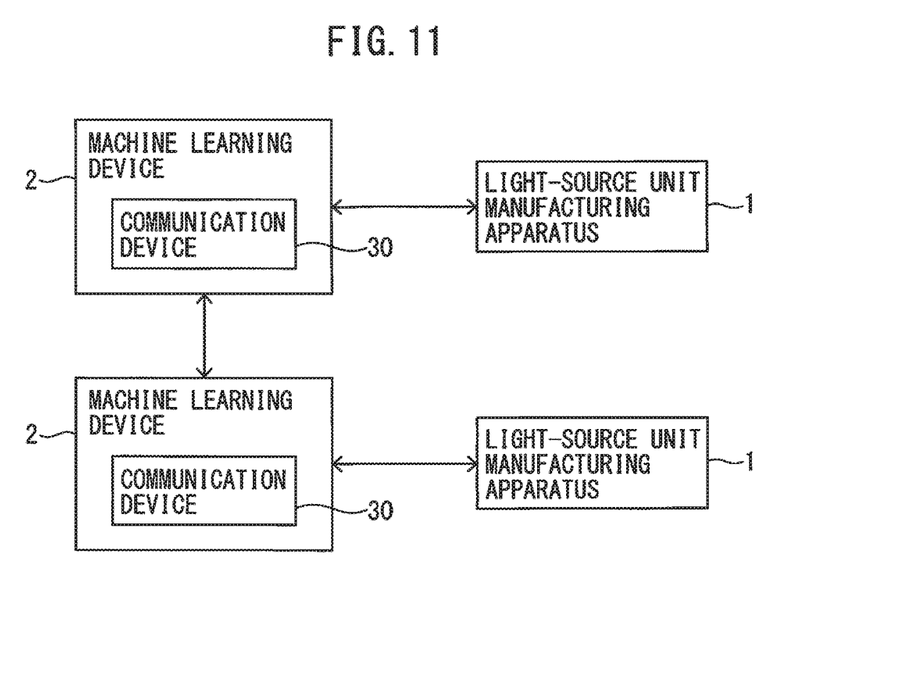
FIG. 11 is a block diagram of a second manufacturing system according to the embodiment.

FIG. 11 shows a block diagram of a second manufacturing system according to the present embodiment. In the second manufacturing system, multiple machine learning devices 2 are connected to each other via communication devices. In the example of FIG. 11, the two machine learning devices 2 are connected to each other via the communication devices. The machine learning device 2 includes a communication device 30 for communicating with the other machine learning device. One of the machine learning devices receives the state data and the decision data from the other machine learning device.

The machine learning devices are connected to each other, whereby a large amount of learning data can be shared between the machine learning devices. Moreover, a value function can be shared between the machine learning devices. Thus, the value function can be quickly updated so as to shorten the time for determining an optimum value function and action value. In other words, the learning time of the machine learning device is reduced.

Furthermore, machine learning devices at remote locations can be connected to each other. For example, when a new factory is built at a remote location, the alignment conditions of a light source unit can be set in a short time. Furthermore, when an additional production line for the same light source unit is installed, the alignment conditions can be set in a short time. As a result, the manufacturing efficiency of the light source unit is improved in the factory.

In the above embodiment, the machine learning device 2 is connected to the light-source unit manufacturing apparatus 1. The present invention is not limited to this configuration. The light-source unit manufacturing apparatus may have the function of the machine learning device.

Figure 12:
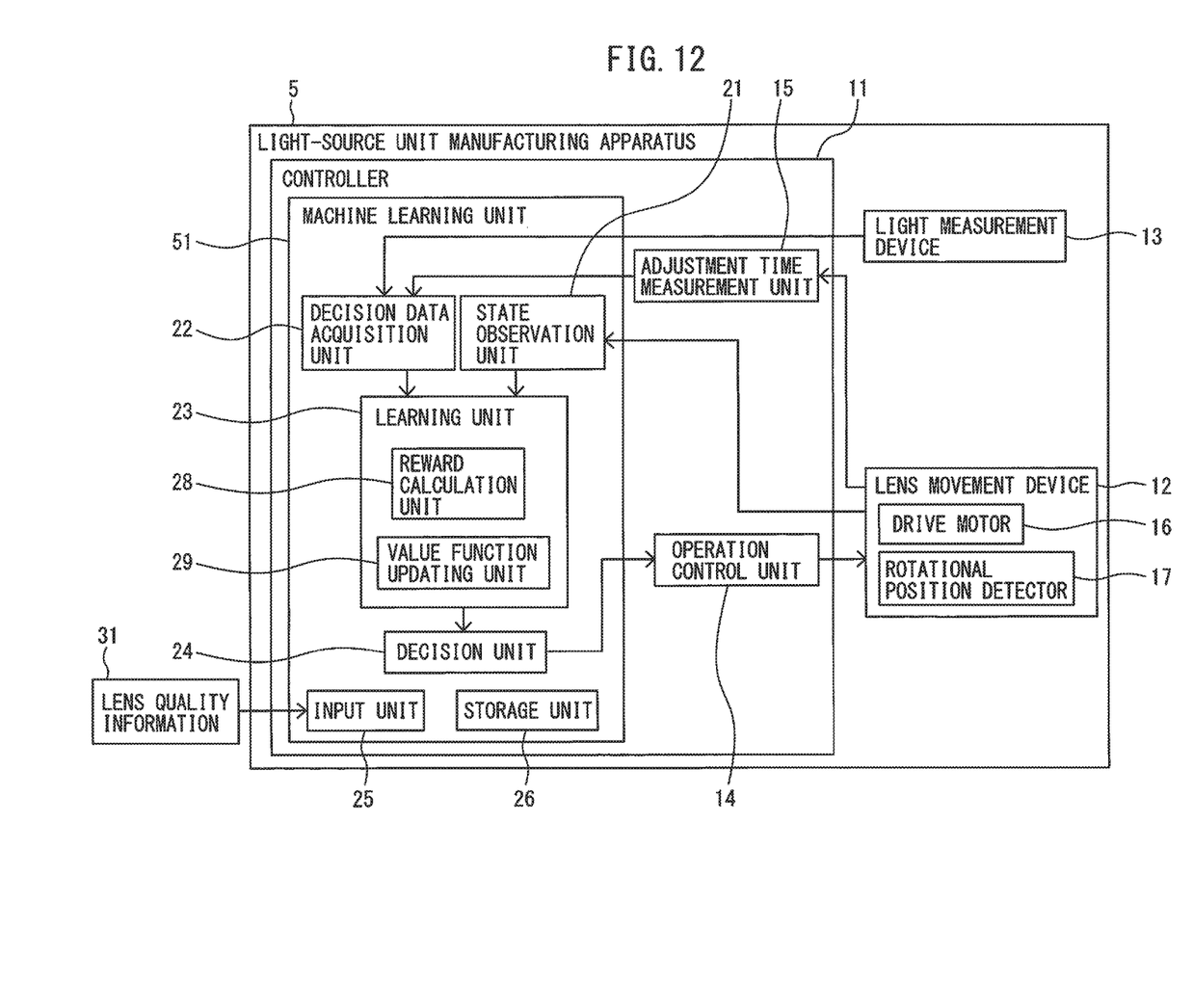
FIG. 12 is a block diagram of a third manufacturing system according to the embodiment.

FIG. 12 shows a block diagram of a third manufacturing system according to the present embodiment. The third manufacturing system includes a light-source unit manufacturing apparatus 5. A controller 11 in the light-source unit manufacturing apparatus 5 includes a machine learning unit 51 that has the function of the machine learning device 2 of the first manufacturing system. The machine learning unit 51 includes a state observation unit 21, a decision data acquisition unit 22, a learning unit 23, and a decision unit 24.

The decision data acquisition unit 22 can acquire a state of light from a light measurement device 13. Moreover, the decision data acquisition unit 22 can acquire a lens alignment time from an adjustment time measurement unit 15. The state observation unit 21 can acquire the position and the orientation of the lens based on the output of a rotation position detector 17 of a lens movement device 12. The decision unit 24 can transmit an operation command of the lens to an operation control unit 14.

The machine learning unit 51 includes an input unit 25 and a storage unit 26. Lens quality information 31 is inputted to the input unit 25 and is stored in the storage unit 26. The state observation unit 21 acquires the lens quality information 31 from the storage unit 26. Other configurations and functions of the machine learning unit 51 are similar to those of the machine learning device 2 (see FIG. 2) of the first manufacturing system 8.

In this way, the controller of the light-source unit manufacturing apparatus can have the function of machine learning. Also in this case, the controllers in the multiple light-source unit manufacturing apparatuses may be connected to one another. By adopting this configuration, the value function and the action value can be shared among the light-source unit manufacturing apparatuses, thereby the learning time can be reduced.

In the above embodiment, the lens quality information is inputted to the input unit. The present invention is not limited to this embodiment. Quality information on the components of the light source unit can be inputted to the input unit. Moreover, the state observation unit can acquire state data that includes quality information on the components. The learning unit can conduct machine learning based on this state data.

The components of the light source unit include optical parts. The optical parts include a light-emitting element, a light-receiving element, a mirror, a filter, an optical fiber, a splitter, and the like. The components also include a cabinet. For example, quality information on the light-emitting element includes characteristics such as light wavelength, light intensity, temperature characteristics, and spread angle, and manufacturing information such as material lot, a manufacturing apparatus, an operator, a manufacturing process, and date of manufacture. At least one of these items may be used as the quality information on the light-emitting element. Quality information on the cabinet includes manufacturing information such as cabinet shape, (cabinet shape error), material lot, a manufacturing apparatus, an operator, a manufacturing process, and date of manufacture. At least one of these items may be used as the quality information on the cabinet. The quality of the components affects the alignment of the optical parts. The state observation unit can acquire the information on the quality of any constitution parts. The learning unit can conduct learning based on the acquired quality of the components.

In the present embodiment, the lens was described as an example of the optical part for alignment. The present invention is not limited to this configuration. Adjustment to a position and an orientation through machine learning is applicable to any optical parts that are disposed in a light source unit.

The light source unit of the present embodiment includes the two lenses, a single light-emitting element, and a single light-receiving element. The present invention is not limited to this configuration. The light source unit may include any number of optical parts. For example, the light source unit may include a filter or a mirror that is disposed between the lenses or may cause a single light-receiving element to receive the light that is outputted from multiple light-emitting elements.

An aspect of the present disclosure can provide a machine learning device that learns the procedure for aligning the optical parts of the light source unit in a short time, and the light-source unit manufacturing apparatus.

In the above controls, the order of steps can be optionally changed as long as the functions and effects are not changed.

The embodiment may be optionally combined with another. In the drawings that are described above, the same or equivalent parts are indicated by the same reference numerals. The embodiment is merely exemplary and thus does not limit the present invention. The embodiment includes changes of the embodiment within the scope of claims.

The invention claimed is:

1. A machine learning device that learns a procedure for aligning optical parts of a light source unit, the machine learning device comprising:
    a state observation unit that acquires state data including a position and an orientation of the optical part and quality information on a component of the light source unit;
    a decision data acquisition unit that acquires decision data including an adjustment time of the position and the orientation of the optical part and a state of light measured by a light measurement device; and
    a learning unit that learns a procedure for adjusting the position and the orientation of the optical part based on the state data acquired by the state observation unit and the decision data acquired by the decision data acquisition unit,
    the learning unit including:
    a reward calculation unit that calculates a reward based on the adjustment time and the state of light that are acquired by the decision data acquisition unit;
    a value function updating unit that updates a value function based on the reward set by the reward calculation unit; and
    a decision unit that sets a movement method of the optical part based on the value function.

2. The machine learning device according to claim 1, wherein the state of light includes at least one of light intensity, a mode pattern, and a center position of light.

3. The machine learning device according to claim 1, wherein
    the components are lenses, and
    the quality information on the components includes at least one of material component, lens shape, index of refraction, focal length, characteristics of an optical thin film deposited on a surface, material lot, manufacturing apparatus, operator, manufacturing process, and date of manufacture.

4. The machine learning device according to claim 1, further comprising a communication device that communicates with the other machine learning device; wherein
    the machine learning device receives state data and decision data from the other machine learning device, and shares the value function with the other machine learning device.

5. A light-source unit manufacturing apparatus comprising:
    a light measurement device that measures a state of light outputted from a light-emitting element;
    a movement device that moves an optical part while holding the optical part; and
    a controller that controls the movement device,
    the controller including:
    a state observation unit that acquires state data including a position and an orientation of the optical part and quality information on a component;
    a decision data acquisition unit that acquires decision data including an adjustment time of the position and the orientation of the optical part and the state of light measured by the light measurement device; and
    a learning unit that learns a procedure for adjusting the position and the orientation of the optical part based on the state data acquired by the state observation unit and the decision data acquired by the decision data acquisition unit,
    the learning unit including:
    a reward calculation unit that calculates a reward based on the adjustment time and the state of light that are acquired by the decision data acquisition unit;
    a value function updating unit that updates a value function based on the reward set by the reward calculation unit; and
    a decision unit that sets a movement method of the optical part based on the value function.

* * * * *